United States Patent [19]

Froix

[11] 4,267,289

[45] May 12, 1981

[54] BLEND OF WHOLLY AROMATIC POLYESTERS

[75] Inventor: Michael F. Froix, Menlo Park, Calif.

[73] Assignee: Celanese Corporation, New York, N.Y.

[21] Appl. No.: 165,534

[22] Filed: Jul. 3, 1980

[51] Int. Cl.$^3$ .............................................. C08L 67/00
[52] U.S. Cl. .................................. 525/444; 260/40 R; 260/40 P; 264/35; 264/176 R; 264/176 F; 264/345
[58] Field of Search .................. 525/444; 264/35, 345, 264/176 R, 176 F; 260/40 R, 40 P

[56] References Cited

U.S. PATENT DOCUMENTS

| | | | |
|---|---|---|---|
| 4,161,470 | 7/1979 | Calundann | 260/40 R |
| 4,184,996 | 1/1980 | Calundann | 260/40 R |
| 4,219,461 | 8/1980 | Calundann | 260/40 R |

Primary Examiner—J. Ziegler
Attorney, Agent, or Firm—Kenneth A. Genoni

[57] ABSTRACT

A polymer blend which is capable of exhibiting an anisotropic melt phase and which is capable of forming shaped articles which exhibit satisfactory mechanical properties is provided. The polymer blend comprises approximately 5 to approximately 95 percent by weight, based upon the total weight of the blend, of a first melt processable wholly aromatic polyester which is capable of forming an anisotropic melt phase apart from the blend and which comprises not less than approximately 10 mole percent of recurring units which include a naphthalene moiety, and approximately 5 to approximately 95 percent by weight, based upon the total weight of the blend, of a second melt processable wholly aromatic polyester which is capable of forming an anisotropic melt phase apart from the blend (as defined).

39 Claims, 1 Drawing Figure

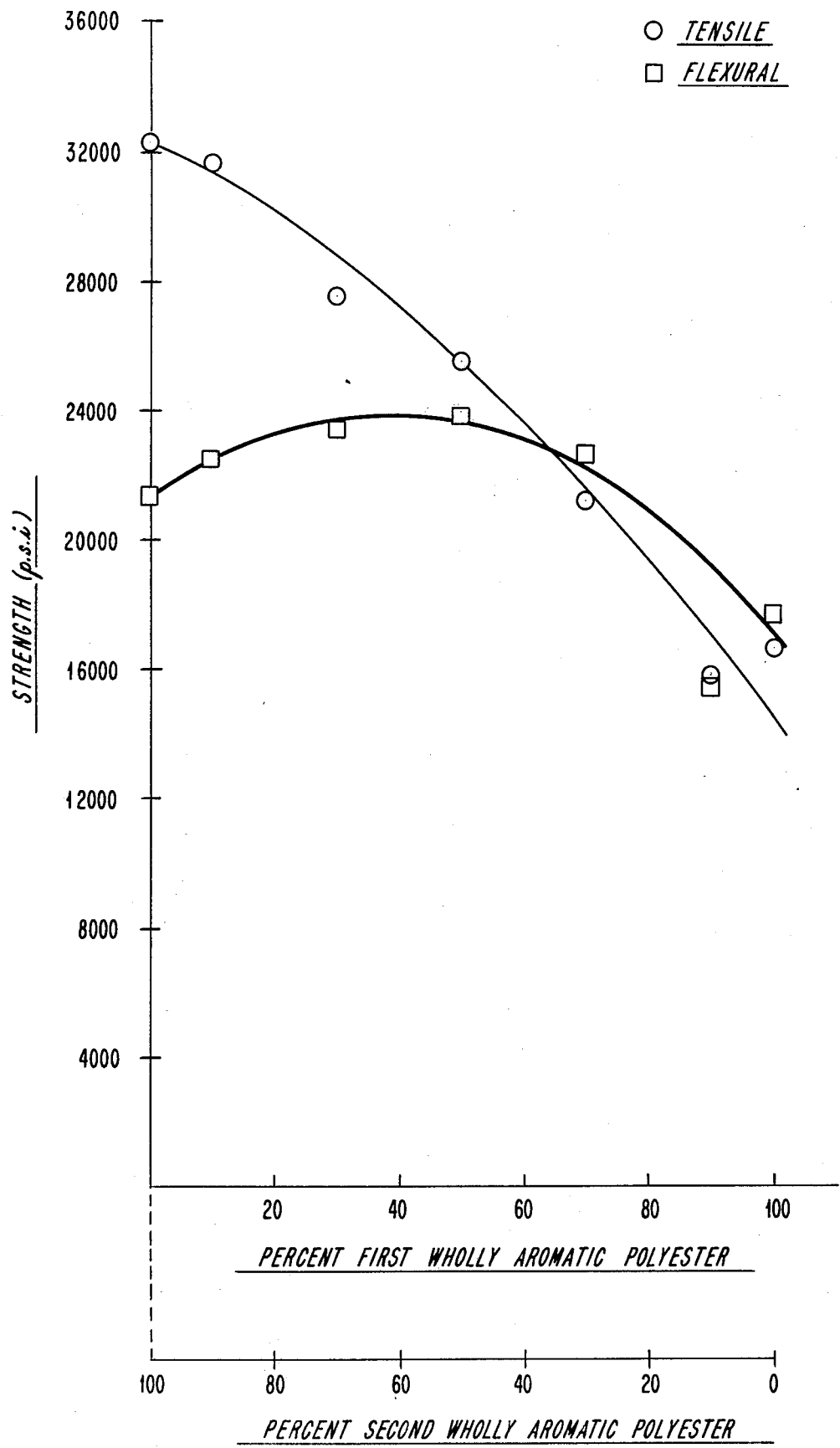

BLEND OF WHOLLY AROMATIC POLYESTERS

BACKGROUND OF THE INVENTION

The present invention relates to a blend of melt processable wholly aromatic polyesters. The characteristics and properties of such a blend differ significantly from those expected in light of observations of the properties of ordinary mixtures and of most polymeric blends.

When a blend or mixture is prepared from two or more ordinary, non-polymeric materials, a random distribution of the molecules of the components is obtained. This random distribution provides complete mixing without the formation of groups or clusters of the molecules of any one component. Such a mixture is expected to follow the "Rule of Mixtures." The Rule of Mixtures predicts the numerical values of properties of a blend to be the weighted average of the numerical values of the properties of the components.

A discussion of the Rule of Mixtures can be found in *Predicting the Properties of Mixtures: Mixture Rules in Science and Engineering*, by Lawrence E. Nielsen, Marcel Dekker Inc. (New York).

Further information with regard to the Rule of Mixtures can be found on pages 395, 436, 465, 492, and 500 of Volume 2 of *Mechanical Properties of Polymers and Composites*, by Lawrence E. Nielsen, Marcel Dekker Inc. (New York: 1974). As stated therein, mixtures of a polymer matrix with a fibrous reinforcing agent, a ribbon-shaped filler, or a rod-shaped filler are known to follow the Rule of Mixtures. The above-cited reference further discloses that mixtures of phase inverted isotropic interpenetrating polymer networks, such as a phase inverted network of polystyrene and polybutadiene, are also known to follow the Rule of Mixtures.

Mixtures of chemically distinct polymeric materials have been found to deviate from the behavior of ordinary mixtures as characterized by the Rule of Mixtures. The sheer size of polymeric chains restricts mixing of the components and leads to the formation of domains or clusters of molecules of the individual components. Thus, it can be said that most chemically distinct polymeric materials tend to be incompatible in mixtures, exhibiting a tendency to separate into phases. There exists a boundary between the domains of the component polymers, and articles made from such a blend would be expected to exhibit failure at the boundary when placed under stress. In general, then, the mechanical properties of the product are commonly reduced rather than enhanced. Specific properties which may be thus affected include tensile strength, tensile modulus, flexural strength, flexural modulus, and impact strength.

Some polymeric materials, such as most wholly aromatic polyesters, exhibit an ordered structure in at least some regions of the polymer. This order can exist in one, two, or three dimensions. The inclusion of such polymers in blends leads to an increased tendency of the blends to separate into phases. This is due to the fact that the order found in certain regions of the polymer causes a fairly sharp boundary between the domains of the molecules of the component polymers. Thus, blends including such polymers would be expected to exhibit a significant reduction in mechanical properties. Accordingly, there has been little impetus to form such blends, particularly for use in applications where mechanical properties are of importance.

U.K. Published Patent Application No. 2,008,598 discloses a polymer composition comprising 20 percent or less, based upon the total weight of polymeric material, of a first rigid polymeric material with the balance being a second polymeric material composed substantially of flexible molecular chains. The first polymeric material is dispersed in the second polymeric material in a microscopic region of 1 μm. or less. Foreign counterparts of this application include Japan No. 54065747, French No. 2407956, and West German No. 2847782. This application does not disclose blends of two rigid polymeric materials, such as two wholly aromatic polyesters.

It is therefore an object of the present invention to provide a blend of wholly aromatic polyesters which exhibits satisfactory mechanical properties, such as tensile strength, tensile modulus, flexural strength, flexural modulus, impact strength, and heat deflection temperature.

It is also an object of the present invention to provide a blend of wholly aromatic polyesters which exhibits, within at least some compositional ranges, mechanical properties, such as flexural strength, which are improved over those of each component alone.

It is also an object of the present invention to provide a blend of wholly aromatic polyesters which exhibits no significant reduction in mechanical properties, such as tensile and flexural strengths, as compared to the weighted average of the mechanical properties of the individual components.

It is also an object of the present invention to provide a blend of wholly aromatic polyesters which exhibits a high degree of anisotropy and shear sensitivity in the melt.

These and other objects as well as the scope, nature, and utilization of the present invention will be apparent from the following description and appended claims.

SUMMARY OF THE INVENTION

The present invention provides a polymer blend which is capable of exhibiting an anisotropic melt phase and which is capable of forming shaped articles which exhibit satisfactory mechanical properties. The blend comprises:

(a) approximately 5 to approximately 95 percent by weight, based upon the total weight of components (a) and (b), of a first melt processable wholly aromatic polyester which is capable of forming an anisotropic melt phase apart from the blend and comprises not less than approximately 10 mole percent of recurring units which include a naphthalene moiety, and (b) approximately 5 to approximately 95 percent by weight, based upon the total weight of components (a) and (b), of a second melt processable wholly aromatic polyester which is capable of forming an anisotropic melt phase at a temperature no higher than approximately 320° C. apart from the blend and which consists essentially of the recurring moieties I, II, III, and IV wherein:

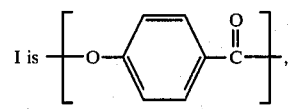

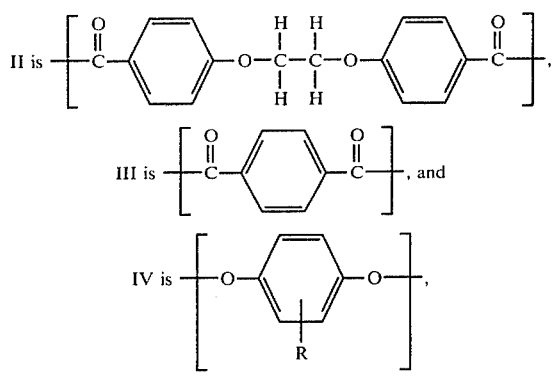

where R is methyl, chloro, bromo, or mixtures thereof, and is substituted for a hydrogen atom present upon the aromatic ring, and wherein the second wholly aromatic polyester comprises approximately 20 to 60 mole percent of moiety I, approximately 5 to 18 mole percent of moiety II, approximately 5 to 35 mole percent of moiety III, and approximately 20 to 30 mole percent of moiety IV.

DESCRIPTION OF THE DRAWING

The drawing is a graphical representation of the tensile and flexural strengths of molded test bars comprising the blend prepared according to Example 1 as a function of the composition of the blend.

DETAILED DESCRIPTION OF THE INVENTION

The present invention provides a blend of melt processable, wholly aromatic polyesters. As used herein, the term "blend" includes any physical blend, mixture, or alloy of the polymeric components.

The wholly aromatic polyesters which may be used in the blend of the present invention comprise at least two recurring moieties which, when combined in the polyester, have been found to form an atypical anisotropic melt phase. The aromatic polyesters are considered to be "wholly" aromatic in the sense that each moiety present in the polyester contributes at least one aromatic ring to the polymer backbone.

Wholly aromatic polyester resins long have been known. For instance, 4-hydroxybenzoic acid homopolymer and copolymers have been provided in the past and are commercially availabe. Certain of the wholly aromatic polyesters encountered in the prior art tend to be somewhat intractable in nature and to present substantial difficulties if one attempts to melt process the same while employing conventional melt processing procedures. Such polymers commonly are crystalline in nature, relatively high melting or possess a decomposition temperature which is below the melting point, and when molten frequently exhibit an isotropic melt phase. Molding techniques such as compression molding or sintering may be utilized with such materials; however, injection molding, melt spinning, etc., commonly have not been viable alternatives or when attempted commonly have been accomplished with difficulty. It is to be understood that the wholly aromatic polyesters which are suitable for use in the present invention are limited to those which are capable of undergoing melt processing, i.e., those which exhibit no substantial decomposition at or below the melting point.

In addition to being wholly aromatic and capable of undergoing melt processing, the polyesters which are useful in the blend of the present invention must exhibit, apart from the blend, optical anisotropy in the melt. Recent publications disclosing such polyesters include (a) Belgian Pat. Nos. 828,935 and 828,936, (b) Dutch Pat. No. 7505551, (c) West German Pat. Nos. 2,520,819, 2,520,820, and 2,722,120, (d) Japanese Pat. Nos. 43-223, 2132-116, 3017-692, and 3021-293, (e) U.S. Pat. Nos. 3,991,013; 3,991,014; 4,057,597; 4,066,620; 4,075,262; 4,118,372; 4,156,070; 4,159,365; 4,169,933; and 4,181,792; (f) U.K. Application No. 2,002,404, and (g) commonly-assigned U.S. Pat. Nos. 4,067,852; 4,083,829; 4,130,545; 4,161,470; and 4,184,996; and commonly-assigned U.S. Application Ser. Nos. 10,392, filed Feb. 8, 1979; 10,393, filed Feb. 8, 1979; 17,007, filed Mar. 2, 1979; 21,050, filed Mar. 16, 1979 (now U.S. Pat. No. 4,224,433); 32,086, now U.S. Pat. No. 4,219,461, filed Apr. 23, 1979 (now U.S. Pat. No. 4,219,461); 36,959, filed May 7, 1979 pending; 54,049 allowed, filed July 2, 1979; and 91,003, filed Nov. 5, 1979 undefined. The wholly aromatic polyesters disclosed in the patent documents of (g) above typically are capable of forming an anisotropic melt phase apart from the blend at a temperature below approximately 400° C., and preferably below approximately 350° C.

The wholly aromatic polyesters which are suitable for use in the blend of the present invention may be formed by a variety of ester-forming techniques whereby organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a melt solution of the reactants with the reaction continuing as solid polymer particles are suspended therein. A vacuum may be applied to facilitate removal of volatiles formed during the final stage of the condensation (e.g., acetic acid or water).

In commonly-assigned U.S. Pat. No. 4,083,829, entitled "Melt Processable Thermotropic Wholly Aromatic Polyester," is described a slurry polymerization process which may be employed to form the wholly aromatic polyesters which are suitable for use in the present invention. According to such a process, the solid product is suspended in a heat exchange medium. The disclosure of this patent is herein incorporated by reference.

When employing either the melt acidolysis procedure or the slurry procedure of U.S. Pat. No. 4,083,829, the organic monomer reactants from which the wholly aromatic polyesters are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts, such as Lewis acids (e.g., BF$_3$), hydrogen halides (e.g., HCl), etc. The quantity of catalyst utilized typically is about 0.001 to 1 percent by weight based upon the total monomer weight, and most commonly about 0.01 to 0.2 percent by weight.

The wholly aromatic polyesters suitable for use in the present invention tend to be substantially insoluble in common polyester solvents and accordingly are not susceptible to solution processing. As discussed previously, they can be readily processed by common melt processing techniques. Most suitable wholly aromatic polyesters are soluble in pentafluorophenol.

The wholly aromatic polyesters which are suitable for use in the blend of the present invention commonly exhibit a weight average molecular weight of about 2,000 to 200,000, and preferably about 10,000 to 50,000, e.g., about 20,000 to 25,000. Such molecular weight may be determined by standard techniques not involving the solutioning of the polymer, e.g., by end group determination via infrared spectroscopy on compression molded films. Alternatively, light scattering techniques in a pentafluorophenol solution may be employed to determine the molecular weight.

The wholly aromatic polyesters additionally commonly exhibit an inherent viscosity (i.e., I.V.) of at least approximately 2.0 dl./g., e.g., approximately 2.0 to 8.0 dl./g., when dissolved in a concentration of 0.1 percent by weight in pentafluorophenol at 60° C.

The liquid crystalline, wholly aromatic polyesters appear to have excellent electrical properties when used as films or coatings in electrical applications. They have high temperature resistance and high dielectric strength, i.e., they are capable of withstanding high voltages without exhibiting substantial breakdown.

The above-described polyesters, in order to be useful in the blend of the present invention, must exhibit optical anisotropy in the melt phase. These polyesters readily form liquid crystals in the melt phase and accordingly exhibit a high tendency for the polymer chains to orient in the shear direction. Such anisotropic properties are manifested at a temperature at which the wholly aromatic polyester readily undergoes melt processing to form shaped articles. The anisotropic properties may be confirmed by conventional polarized light techniques whereby crossed-polarizers are utilized. More specifically, the anisotropic melt phase may conveniently be confirmed by the use of a Leitz polarizing microscope at a magnification of 40× with the sample on a Koffler hot stage and under a nitrogen atmosphere. The melt phases of the wholly aromatic polyesters which are suitable for use in the present invention are optically anisotropic, i.e., they transmit light when examined between crossed-polarizers. By contrast, the melt of a conventional polymer will not transmit appreciable light when placed between crossed-polarizers.

The wholly aromatic polyesters decribed above are useful as molding resins and may also be used in the formation of coatings, fibers, and films. They may be molded by injection molding and can be processed by any melt extrusion technique.

For the purposes of the present invention, the aromatic rings which are included in the polymer backbones of the polymer components may include substitution of at least some of the hydrogen atoms present upon an aromatic ring. Such substituents include alkyl groups of up to five carbon atoms; alkoxy groups having up to five carbon atoms; halogens; and additional aromatic rings, such as phenol and substituted groups. Halogens which may be listed as possible substituents include fluorine, chlorine, and bromine. Although bromine atoms tend to be released from organic compounds at high temperatures, bromine is more stable on aromatic rings than on aliphatic chains, and therefore is suitable for inclusion as a possible substituent on the aromatic rings in the present blend.

The first component of the blend of the present invention is a melt processable wholly aromatic polyester which is capable of forming an anisotropic melt phase apart from the blend and comprises not less than approximately 10 mole percent of recurring units which include a naphthalene moiety. Such wholly aromatic polyesters are disclosed, for example, in U.S. Pat. Nos. 4,067,852; 4,083,829; 4,130,545; 4,161,470; and 4,184,996; and in U.S. Application Ser. Nos. 32,086, filed Apr. 23, 1979 (now U.S. Pat. No. 4,219,461); 54,049, filed July 2, 1979; and 91,003, filed Nov. 5, 1979. The polyesters which are preferred for use as the naphthalene moiety-containing component are those wholly aromatic polyesters disclosed in U.S. Pat. Nos. 4,161,470 and 4,184,996 and in U.S. Application Ser. Nos. 32,086, filed Apr. 23, 1979 (now U.S. Pat. No. 4,219,461), and 54,049, filed July 2, 1979, the disclosures of which are herein incorporated by reference.

The polyester disclosed in U.S. Pat. No. 4,161,470 is a melt processable wholly aromatic polyester which is capable of forming an anisotropic melt phase at a temperature below approximately 350° C. apart from the blend. The polyester consists essentially of the recurring moieties I and II wherein:

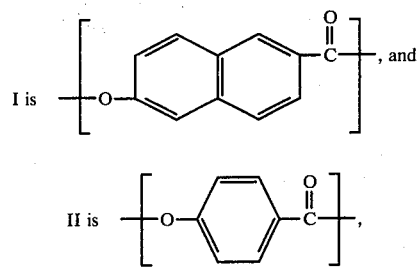

wherein said polyester comprises approximately 10 to 90 mole percent of moiety I, and approximately 10 to 90 mole percent of moiety II. In one embodiment, moiety II is present in a concentration of approximately 65 to 85 mole percent, and preferably in a concentration of approximately 70 to 80 mole percent, e.g., approximately 75 mole percent. In another embodiment, moiety II is present in a lesser proportion of approximately 15 to 35 mole percent, and preferably in a concentration of approximately 20 to 30 mole percent.

The polyester disclosed in U.S. Pat. No. 4,184,996 is a melt processable wholly aromatic polyester which is capable of forming an anisotropic melt phase at a temperature below approximately 325° C. apart from the blend. The polyester consists essentially of the recurring moieties I, II, and III wherein:

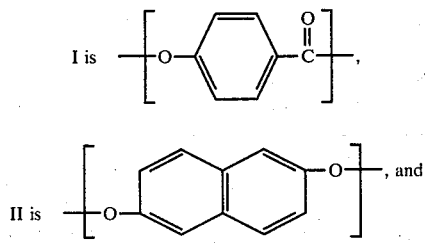

-continued

III is 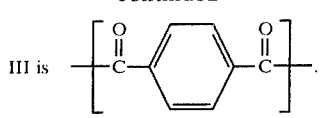

The polyester comprises approximately 30 to 70 mole percent of moiety I. The polyester preferably comprises approximately 40 to 60 mole percent of moiety I, approximately 20 to 30 mole percent of moiety II, and approximately 20 to 30 mole percent of moiety III.

The polyester disclosed in U.S. Application Ser. No. 32,086 is a melt processable wholly aromatic polyester which is capable of forming an anisotropic melt phase at a temperature below approximately 320° C. apart from the blend. The polyester consists essentially of the recurring moieties I, II, II, and IV wherein:

I is 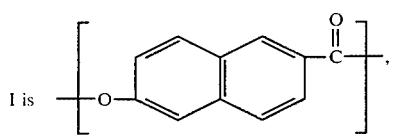

II is 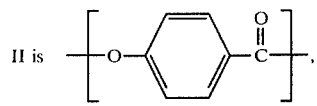

III is a dioxy aryl moiety of the formula

where Ar is a divalent radical comprising at least one aromatic ring, and

IV is a dicarboxy aryl moiety of the formula

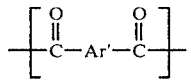

where Ar' is a divalent radical comprising at least one aromatic ring, wherein the polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV. The polyester preferably comprises approximately 20 to 30 (e.g., approximately 25) mole percent of moiety I, approximately 25 to 40 (e.g., approximately 35) mole percent of moiety II, approximately 15 to 25 (e.g., approximately 20) mole percent of moiety III, and approximately 15 to 25 (e.g., approximately 20) mole percent of moiety IV.

Moieties III and IV are preferably symmetrical in the sense that the divalent bonds which join these moieties to other moieties in the main polymer chain are symmetrically disposed on one or more aromatic rings (e.g., are para to each other or diagonally disposed when present on a naphthalene ring). However, non-symmetrical moieties, such as those derived from resorcinol and isophthalic acid, may also be used.

The polyester disclosed in U.S. Application Ser. No. 54,049 is a melt processable wholly aromatic polyester which is capable of forming an anisotropic melt phase at a temperature below approximately 400° C. apart from the blend. The polyester consists essentially of the recurring moieties I, II, and III wherein:

I is 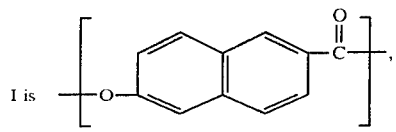

II is a dioxy aryl moiety of the formula

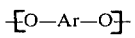

where Ar is a divalent radical comprising at least one aromatic ring, and

III is a dicarboxy aryl moiety of the formula

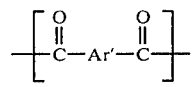

where Ar' is a divalent radical comprising at least one aromatic ring, wherein the polyester comprises approximately 10 to 90 mole percent of moiety I, approximately 5 to 45 mole percent of moiety II, and approximately 5 to 45 mole percent of moiety III. The polyester preferably comprises approximately 20 to 80 mole percent of moiety I, approximately 10 to 40 mole percent of moiety II, and approximately 10 to 40 mole percent of moiety III. The polyester more preferably comprises approximately 60 to 80 mole percent of moiety I, approximately 10 to 20 mole percent of moiety II, and approximately 10 to 20 mole percent of moiety III.

As with moieties III and IV of the polyester disclosed in U.S. Application Ser. No. 32,086, moieties II and III of the polyester described immediately above may be symmetrical or non-symmetrical, but are preferably symmetrical.

The polyester which is most preferred for inclusion as the first wholly aromatic polyester in the blend of the present invention is the polyester disclosed in U.S. Pat. No. 4,184,996.

The second wholly aromatic polyester component of the blend of the present invention is the one disclosed in U.S. Application Ser. No. 10,392. This polyester is a melt processable wholly aromatic polyester which is capable of forming an anisotropic melt phase apart from the blend at a temperature no higher than approximately 320° C. The polymer consists essentially of the recurring moieties I, II, III, and IV wherein:

I is 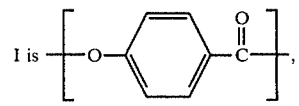

II is 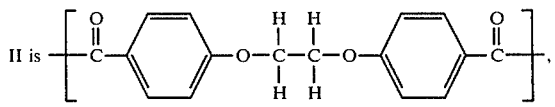

III is 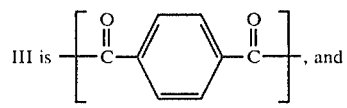, and

IV is 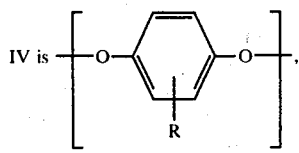

where R is methyl, chloro, bromo, or mixtures thereof, and is substituted for a hydrogen atom present upon the aromatic ring. The R group is preferably a methyl group.

The polyester comprises approximately 20 to 60 mole percent of moiety I, approximately 5 to 18 mole percent of moiety II, approximately 5 to 35 mole percent of moiety III, and approximately 20 to 40 mole percent of moiety IV. The polyester preferably comprises approximately 35 to 45 mole percent of moiety I, approximately 10 to 15 mole percent of moiety II, approximately 15 to 25 mole percent of moiety III, and approximately 25 to 35 mole percent of moiety IV, with the proviso that the total molar concentration of moieties II and III is substantially identical to that of moiety IV. This wholly aromatic polyester commonly exhibits an inherent viscosity of at least 2.0 dl./g., e.g., 2.0 to 8.0 dl./g., when dissolved in a concentration of 0.3 weight/volume percent in pentafluorophenol at 60° C.

The blend of the present invention comprises approximately 5 to approximately 95 percent by weight of the first wholly aromatic polyester component and approximately 5 to approximately 95 percent by weight of the second wholly aromatic polyester component. Preferably, the blend comprises approximately 5 to approximately 70 percent by weight of the first wholly aromatic polyester component and approximately 30 to approximately 95 percent by weight of the second wholly aromatic polyester component. The above weight percentages are based upon the total weight of the first wholly aromatic polyester component and the second wholly aromatic polyester component.

In preparing the blend of the present invention, the individual components are commonly provided in the form of chips or pellets. Each of the components is weighed separately, and then the components are physically mixed together in any appropriate apparatus, e.g., a ball mill. The physical mixture is then dried at approximately 100° C. overnight or for a period of time of approximately 24 hours. The mixture is conveniently dried in a vacuum oven or in a circulating air oven, although any suitable apparatus may be used. The purpose of the drying step is to remove water from the physical mixture so as to prevent degradation of the polymer blend. After the mixture of solid polymer particles has been dried, the polymer blend can then be prepared. A convenient method of forming the polymer blend is melt extrusion. The extrusion apparatus thoroughly mixes the polymers in the melt and then extrudes the blend in the form of a strand which, upon solidification, can be broken up into chips or pellets.

As previously discussed, it is known in the art that blends of two polymers tend to exhibit phase separation, with a concomitant reduction in properties, due to the incompatibility of the polymers, i.e., the formation of domains. However, unexpected and surprising results are achieved with the blend of the present invention. It has been observed that there is no significant reduction in mechanical properties, such as tensile and flexural strengths, of the blend when compared to the weighted average of the mechanical properties of the components. In fact, within certain compositional ranges there is an increase in such properties as flexural strength over even the individual component exhibiting the better mechanical properties.

The blend of the present invention is capable of undergoing melt processing at a temperature within the range of approximately 260° C. to 350° C. Preferably, the blend is capable of undergoing melt processing at a temperature within the range of approximately 280° C. to 300° C.

The blend of the present invention demonstrates anisotropy in the melt phase. Thus the blend retains the excellent processability characteristics of the individual wholly aromatic polyesters.

The blend of the present invention is useful as a molding resin, and especially for injection molding. The blend can also be used in the formation of fibers and films. Articles molded from the blend of the present invention exhibit good mechanical properties, such as tensile strength, tensile modulus, flexural strength, flexural modulus, notched Izod impact strength, and heat deflection temperature.

Articles may also be molded from a molding compound which includes, as one component, the blend of the present invention. Such a molding compound incorporates into the blend of the present invention approximately 1 to 50 percent, preferably approximately 10 to 30 percent, by weight, based upon the total weight of the molding compound, of a solid filled and/or reinforcing agent. Representative fibers which may serve as reinforcing media include glass fibers, asbestos, graphitic carbon fibers, amorphous carbon fibers, synthetic polymeric fibers, aluminum fibers, aluminum silicate fibers, oxide of aluminum fibers, titanium fibers, magnesium fibers, rock wool fibers, steel fibers, etc. Representative filler materials include calcium silicate, silica, clays, talc, mica, polytetrafluoroethylene, graphite, alumina trihydrate, sodium aluminum carbonate, barium ferrite, etc.

In order to form an article by injection molding from the present blend, or from a molding compound made from the present blend, the blend or molding compound is brought to the melt temperature of the blend, e.g., approximately 280° C. to 300° C., and is then injected into a mold cavity. The mold cavity is commonly maintained at a temperature of approximately 90° C. to 100° C. The blend in its melt phase is injected into the mold cavity at a pressure of approximately 10,000 p.s.i. The cycle time (i.e., the time between injections) for the present blend commonly is about 10 to 40 seconds.

The properties of articles formed from the blend of the present invention, especially blend compositions having a high content of the first wholly aromatic polyester, can be improved by heat treatment. The articles may be thermally treated in an inert atmosphere (e.g., nitrogen, argon, helium) or alternatively a flowing oxygen-containing atmosphere (e.g., air). For instance, the article may be brought to a temperature approximately 10° C. to 30° C. below the melting point of the blend, at which temperature the article remains a solid object. The heat treatment times commonly range from a few minutes to a number of days, e.g., from 0.5 to 200 hours, or more. Preferably, the heat treatment is conducted for a time of 48 to 72 hours. The heat treatment improves the properties of the article by increasing the molecular weight of the liquid crystalline polymer and increasing the degree of crystallinity.

Heat treatment can be expected to provide an increase in the heat deflection temperature of the blend. The heat deflection temperature is a measure of the upper temperature at which articles formed from the blend can be effectively used. The blend of the present invention can be characterized as a high performance blend in that it is capable of forming shaped articles having heat deflection temperatures of at least approximately 200° C. Thus, the blend of the present invention is useful in applications involving relatively high temperatures.

It has been observed that the properties of articles formed from the blend of the present invention vary with the processing conditions, such as mold temperature, injection pressure, cycle time, etc. However, it would be obvious to one of ordinary skill in the art to experimentally determine those conditions which maximize the properties of articles formed from the present blend.

and were subsequently physically mixed together in a ball mill. The mixture of solid particles was dried at approximately 100° C. overnight in a vacuum oven or circulating air oven. The mixture of solid particles was then heated until a melt phase was formed, and the melt was thoroughly mixed in a conventional melt extrusion apparatus. The resulting blend was extruded into the form of a strand, which, upon solidification, was broken up into solid particles of the polymer blend.

In order to measure the mechanical properties of the blend, shaped articles were molded from the polymer blend compositions. The solid particles of the various compositions were heated to the melt temperature of the blend (approximately 280° C.), and were subsequently injected into a mold cavity at an injection pressure of approximately 10,000 p.s.i. The mold cavity was held at a temperature of approximately 94° C. The cycle time for the injection molding process was approximately 40 seconds.

The mechanical properties of the blend were measured and are shown in Table I.

TABLE I

| Blend Composition | Tensile Strength (p.s.i.) | Elongation (%) | Tensile Modulus (p.s.i. × $10^6$) | Flexural Strength (p.s.i.) | Flexural Modulus (p.s.i. × $10^6$) | Notched Izod Impact Strength (ft.-lbs.) | Heat Deflection Temp. at 264 p.s.i. (°C.) |
|---|---|---|---|---|---|---|---|
| Second Wholly Aromatic Polyester | 32300 | 4.31 | 1.76 | 21300 | 1.28 | 7.21 | 199 |
| Second Wholly Aromatic Polyester: First Wholly Aromatic Polyester | | | | | | | |
| 90:10 | 31800 | 3.65 | 1.85 | 22500 | 1.44 | 2.43 | 204 |
| 70:30 | 27500 | 4.24 | 1.58 | 23300 | 1.56 | 2.54 | 215 |
| 50:50 | 25500 | 3.10 | 1.61 | 23800 | 1.78 | 2.05 | 237 |
| 30:70 | 21200 | 2.28 | 1.49 | 22700 | 1.74 | 2.21 | 253 |
| 10:90 | 15800 | 1.58 | 1.38 | 15800 | 1.48 | 1.46 | 248 |
| First Wholly Aromatic Polyester | 16600 | 1.39 | 1.58 | 17600 | 1.65 | 1.17 | 250 |

The following Example is given as a specific illustration of the invention. It should be understood, however, that the invention is not limited to the specific details set forth in the Example.

EXAMPLE

Blend compositions were prepared by the melt extrusion of a first wholly aromatic polyester and a second wholly aromatic polyester. The first wholly aromatic polyester comprised 60 mole percent of 4-oxybenzoyl units, 20 mole percent of 2,6-dioxynaphthalene units, and 20 mole percent of terephthaloyl units, and exhibited an I.V. of 2.9 dl./g. when dissolved in a concentration of 0.1 percent by weight in pentafluorophenol at 60° C. The second wholly aromatic polyester comprised 40 mole percent of 4-oxybenzoyl units, 15 mole percent of 1,2-ethylenedioxy-4,4'-dibenzoyl units, 15 mole percent of terephthaloyl units, 30 mole percent of methyl substituted 1,4-dioxyphenylene units, and exhibited an inherent viscosity (I.V.) of 2.47 dl./g. when dissolved in a concentration of 0.3 weight/volume percent in pentafluorophenol at 60° C. The ratios of second wholly aromatic polyester:first wholly aromatic polyester in the blend compositions were 90:10, 70:30, 50:50, 30:70, and 10:90.

The component polymers, in the form of solid particles, such as chips or pellets, were weighed separately The tensile properties were determined in accordance with standard test ASTM D638, Type V; the flexural properties were determined in accordance with ASTM D790; the notched Izod impact strength was determined in accordance with ASTM D256; and the heat deflection temperature was determined in accordance with ASTM D648.

The data for tensile strength and flexural strength listed in Table I are presented in the form of a graph in the drawing. This graph clearly demonstrates the surprising and unexpected results provided by the blend compositions prepared in accordance with this example. In general, the tensile and flexural properties are above those which would be predicted from the weighted average of the properties of the individual components. It can be seen that articles formed from compositions containing greater than 30 percent of the second wholly aromatic polyester exhibit tensile and flexural strengths of no less than approximately 21,000 p.s.i. Furthermore, no significant reduction in properties is observed, as would be expected.

It is to be understood that the foregoing detailed description is given merely by way of illustration and that many variations may be made therein without departing from the spirit of the invention.

I claim:

1. A polymer blend which is capable of exhibiting an anisotropic melt phase and which is capable of forming shaped articles which exhibit satisfactory mechanical properties comprising:
   (a) approximately 5 to approximately 95 percent by weight, based upon the total weight of components (a) and (b), of a first melt processable wholly aromatic polyester which is capable of forming an anisotropic melt phase apart from said blend and comprises not less than approximately 10 mole percent of recurring units which include a naphthalene moiety, and
   (b) approximately 5 to approximately 95 percent by weight, based upon the total weight of components (a) and (b), of a second melt processable wholly aromatic polyester which is capable of forming an anisotropic melt phase at a temperature no higher than approximately 320° C. apart from said blend and which consists essentially of the recurring moieties I, II, III, and IV wherein:

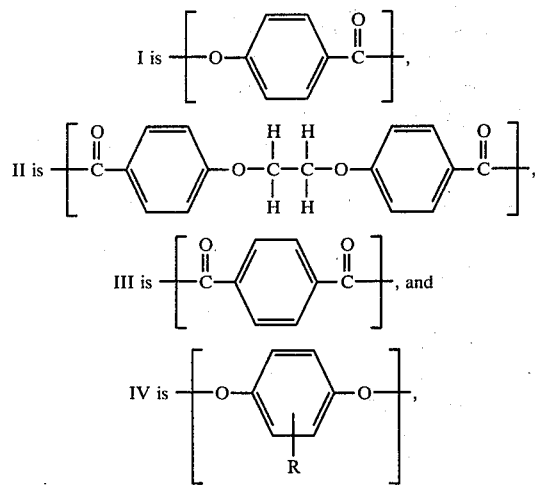

where R is methyl, chloro, bromo, or mixtures thereof, and is substituted for a hydrogen atom present upon the aromatic ring,
and wherein said second wholly aromatic polyester comprises approximately 20 to 60 mole percent of moiety I, approximately 5 to 18 mole percent of moiety II, approximately 5 to 35 mole percent of moiety III, and approximately 20 to 30 mole percent of moiety IV.

2. A polymer blend according to claim 1 wherein said R group of moiety IV of said second wholly aromatic polyester is a methyl group.

3. A polymer blend according to claim 1 which is capable of undergoing melt processing at a temperature within the range of approximately 260° C. to 350° C.

4. A polymer blend according to claim 1 which is capable of undergoing melt processing at a temperature within the range of approximately 280° C. to 300° C.

5. A polymer blend according to claim 1 wherein said first wholly aromatic polyester apart from said blend exhibits an inherent viscosity of at least 2.0 dl./g. when dissolved in a concentration of 0.1 percent by weight in pentafluorophenol at 60° C.

6. A polymer blend according to claim 1 wherein said second wholly aromatic polyester apart from said blend exhibits an inherent viscosity of at least 2.0 dl./g. when dissolved in a concentration of 0.3 weight/volume percent in pentafluorophenol at 60° C.

7. A polymer blend according to claim 1 wherein said naphthalene moiety of said first wholly aromatic polyester is selected from the group consisting of 6-oxy-2-naphthoyl moiety, 2,6-dioxynaphthalene moiety, and 2,6-dicarboxynaphthalene moiety.

8. A polymer blend according to claim 1 wherein said first wholly aromatic polyester apart from said blend is capable of forming an anisotropic melt phase at a temperature below approximately 400° C.

9. A polymer blend according to claim 1 wherein said first wholly aromatic polyester comprises a melt processable wholly aromatic polyester which is capable of forming an anisotropic melt phase apart from said blend at a temperature below approximately 325° C. and consists essentially of the recurring moieties I, II, and III wherein:

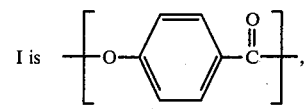

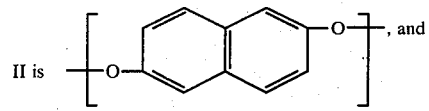

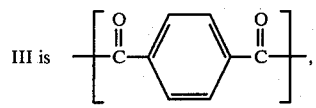

wherein said polyester comprises approximately 30 to 70 mole percent of moiety I.

10. A polymer blend according to claim 1 wherein said first wholly aromatic polyester comprises a melt processable wholly aromatic polyester which is capable of forming an anisotropic melt phase apart from said blend at a temperature below approximately 350° C. and consists essentially of the recurring moieties I and II wherein:

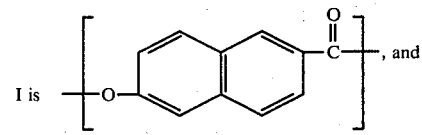

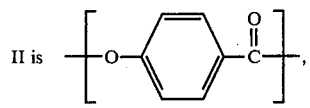

wherein said polyester comprises approximately 10 to 90 mole percent of moiety I, and approximately 10 to 90 mole percent of moiety II.

11. A polymer blend according to claim 1 wherein said first wholly aromatic polyester comprises a melt processable wholly aromatic polyester which is capable of forming an anisotropic melt phase apart from said blend at a temperature below approximately 320° C. and consists essentially of the recurring moieties I, II, III, and IV wherein:

I is 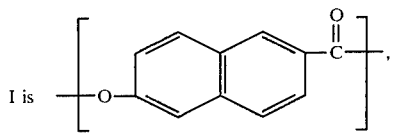

II is 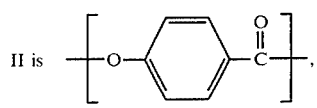

III is a dioxy aryl moiety of the formula

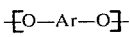

where Ar is a divalent radical comprising at least one aromatic ring, and

IV is a dicarboxy aryl moiety of the formula

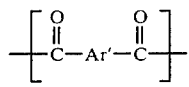

where Ar' is a divalent radical comprising at least one aromatic ring,
wherein said polyester comprises approximately 20 to 40 mole percent of moiety I, in excess of 10 up to about 50 mole percent of moiety II, in excess of 5 up to about 30 mole percent of moiety III, and in excess of 5 up to 30 mole percent of moiety IV.

12. A polymer blend according to claim 1 wherein said first wholly aromatic polyester comprises a melt processable wholly aromatic polyester which is capable of forming an anisotropic melt phase apart from said blend at a temperature below approximately 400° C. and consists essentially of the recurring moieties I, II, and III wherein:

I is 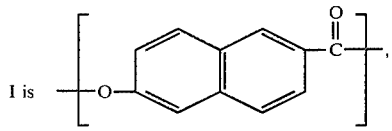

II is a dioxy aryl moiety of the formula

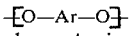

where Ar is a divalent radical comprising at least one aromatic ring, and

III is a dicarboxyl aryl moiety of the formula

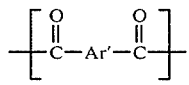

where Ar' is a divalent radical comprising at least one aromatic ring, wherein said polyester comprises approximately 10 to 90 mole percent of moiety I, approximately 5 to 45 mole percent of moiety II, and approximately 5 to 45 mole percent of moiety III.

13. A molding compound comprising the polymer blend of claim 1 which incorporates approximately 1 to approximately 50 percent by weight, based upon the total weight of said molding compound, of a solid filler and/or reinforcing agent.

14. A molding compound according to claim 13 which incorporates approximately 10 to approximately 30 percent by weight, based upon the total weight of said molding compound, of a solid filler and/or reinforcing agent.

15. A molded article comprising the blend of claim 1.

16. A fiber which has been melt spun from the polymer blend of claim 1.

17. A film which has been melt extruded from the polymer blend of claim 1.

18. A shaped article comprising the polymer blend according to claim 1 which has been subjected to heat treatment in a non-oxidizing atmosphere for approximately 10° C. to 30° C. below the melting point of said blend.

19. A shaped article comprising the polymer blend according to claim 1 which has been subjected to heat treatment in a nitrogen atmosphere for approximately 48 to 72 hours at a temperature approximately 10° C. to 30° C. below the melting point of said blend.

20. A polymer blend according to claim 1 which is capable of being satisfactorily molded while employing a mold temperature less than approximately 100° C.

21. A polymer blend which is capable of exhibiting an anisotropic melt phase and which is capable of forming shaped articles which exhibit satisfactory mechanical properties comprising:

(a) approximately 5 to approximately 95 percent by weight, based upon the total weight of components (a) and (b), of a first melt processable wholly aromatic polyester which is capable of forming an anisotropic melt phase at a temperature below approximately 325° C. apart from said blend and consists essentially of the recurring moieties I, II, and III wherein:

I is 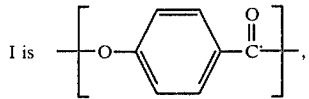

II is 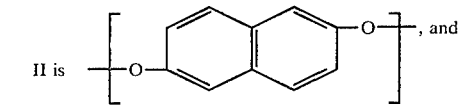

III is 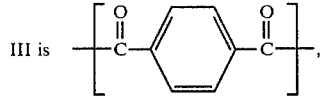

wherein said polyester comprises approximately 30 to 70 mole percent of moiety I, and (b) approximately 5 to approximately 95 percent by weight, based upon the total weight of components (a) and (b), of a second melt processable polyester which is capable of forming an anisotropic melt phase at a temperature no higher than approximately 320° C. apart from said blend and consists essentially of the recurring moieties I, II, III, and IV wherein:

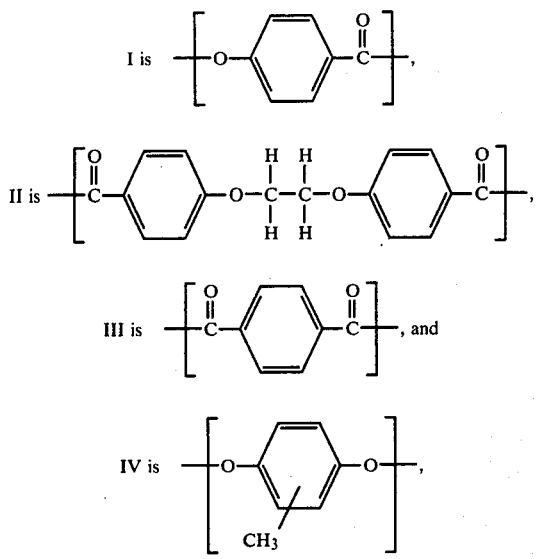

wherein said polyester comprises approximately 20 to 60 mole percent of moiety I, approximately 5 to 18 mole percent of moiety II, approximately 5 to 35 mole percent of moiety III, and approximately 20 to 40 mole percent of moiety IV.

22. A polymer blend according to claim 21 wherein said first melt processable wholly aromatic polyester comprises approximately 40 to 60 mole percent of moiety I, approximately 20 to 30 mole percent of moiety II, and approximately 20 to 30 mole percent of moiety III.

23. A polymer blend according to claim 21 wherein said second melt processable wholly aromatic polyester consists essentially of approximately 35 to 45 mole percent of moiety I, approximately 10 to 15 mole percent of moiety II, approximately 15 to 25 mole percent of moiety III, and approximately 25 to 35 mole percent of moiety IV, with the proviso that the total molar concentration of moieties II and III is substantially identical to that of moiety IV.

24. A polymer blend according to claim 21 which is capable of undergoing melt processing at a temperature within the range of approximately 280° C. to 300° C.

25. A polymer blend according to claim 21 wherein said first wholly aromatic polyester exhibits an inherent viscosity of at least 2.0 dl./g. when dissolved in a concentration of 0.1 percent by weight in pentafluorophenol at 60° C.

26. A polymer blend according to claim 21 wherein said first wholly aromatic polyester exhibits an inherent viscosity of approximately 2.0 to 8.0 dl./g. when dissolved in a concentration of 0.1 percent by weight in pentafluorophenol at 60° C.

27. A polymer blend according to claim 21 wherein said second wholly aromatic polyester exhibits an inherent viscosity of at least 2.0 dl./g. when dissolved in a concentration of 0.3 weight/volume percent in pentafluorophenol at 60° C.

28. A molding compound comprising the blend of claim 21 which incorporates approximately 1 to approximately 50 percent by weight, based upon the total weight of said molding compound, selected from the group consisting of a solid filler, reinforcing agent and mixtures thereof.

29. A molding compound according to claim 28 which incorporates approximately 10 to approximately 30 percent by weight, based upon the total weight of said molding compound, selected from the group consisting of a solid filler, reinforcing agent and mixtures thereof.

30. A molded article comprising the blend of claim 21.

31. A fiber which has been melt spun from the polymer blend of claim 21.

32. A film which has been melt extruded from the polymer blend of claim 21.

33. A shaped article comprising the polymer blend according to claim 21 which has been subjected to heat treatment in a non-oxidizing atmosphere for approximately 0.5 to 200 hours at a temperature approximately 10° C. to 30° C. below the melting point of said blend.

34. A shaped article comprising the polymer blend according to claim 21 which has been subjected to heat treatment in a nitrogen atmosphere for approximately 48 to 72 hours at a temperature approximately 10° C. to 30° C. below the melting point of said blend.

35. A polymer blend according to claim 21 comprising approximately 5 to approximately 70 percent by weight, based upon the total weight of components (a) and (b), of said first wholly aromatic polyester and approximately 30 to approximately 95 percent by weight, based upon the total weight of components (a) and (b), of said second wholly aromatic polyester.

36. A molded article comprising the blend of claim 35.

37. A molded article according to claim 36 which exhibits tensile and flexural strengths of no less than approximately 21,000 p.s.i.

38. A fiber which has been melt spun from the polymer blend of claim 35.

39. A film which has been melt extruded from the polymer blend of claim 35.

* * * * *